United States Patent [19]

Korrenn et al.

[11] 4,000,559
[45] Jan. 4, 1977

[54] COMBINED BEARING

[75] Inventors: Heinz Korrenn, Obbach; Horst Voll, Hassfurt, both of Germany

[73] Assignee: Kugelfischer Georg Schafer & Co., Germany

[22] Filed: Oct. 8, 1975

[21] Appl. No.: 620,765

[30] Foreign Application Priority Data

Oct. 12, 1974 Germany .......................... 2448785

[52] U.S. Cl. ................................. 308/35; 308/170
[51] Int. Cl.² ........................................ F16C 32/00
[58] Field of Search .......... 308/135, 139, 158, 168, 308/170, 174, 35

[56] References Cited

UNITED STATES PATENTS

| 3,499,692 | 3/1970 | Kaiser | 308/35 X |
| 3,708,215 | 1/1973 | Wilcock et al. | 308/35 |
| 3,854,781 | 12/1974 | Bildtsen | 308/35 |

Primary Examiner—Joseph F. Peters
Assistant Examiner—Gene A. Church
Attorney, Agent, or Firm—Brumbaugh, Graves, Donohue & Raymond

[57] ABSTRACT

The combination of an axially loaded rolling bearing with an hydrostatic thrust bearing in a tandem arrangement. The hydrostatic thrust bearing bears against a housing by means of a piston action, and externally produced hydrostatic fluid is conducted from a piston chamber over a controlled flow-off channel.

8 Claims, 1 Drawing Figure

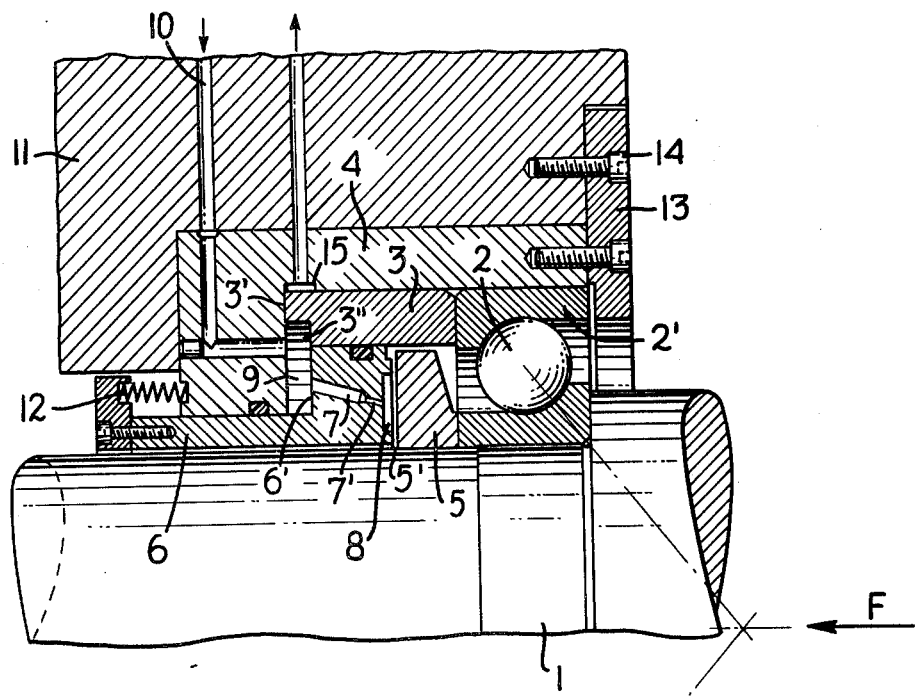

COMBINED BEARING

The present invention relates to combined bearing arrangements, and, more particularly, to the novel and improved combination of an axially loaded rolling bearing with an hydrostatic thrust bearing in a tandem arrangement to constitute a step bearing which, in spite of a variable load, maintains the most constant position possible, whereby the hydrostatic thrust bearing bears against a housing by way of a piston, and externally produced pressure oil, constant in quantity, is conducted from a piston chamber over a controlled flow-off channel from the hydrostatic thrust bearing.

Rolling bearings are comparatively simple and low-cost bearings. Therefore, they are used in the most diversified applications. Certain structural forms, such as angular contact bearings, steep-angle bearings, tapered-roller bearings, are able to receive axial in addition to radial forces. In many fields of application, e.g., combustion turbines, the demands made on the bearings regarding numbers of revolution and load, especially axial load, become increasingly higher so that frequently, a short lifespan must be expected. In such cases, friction bearings operating hydrodynamically or hydrostatically may be used. However, such bearings, too, suffer from considerable shortcomings. For example, hydrodynamic friction bearings operate insufficiently during starting and stopping operations, i.e., with lower engine speeds. Hydrostatic bearings are not sufficiently safe in operation in that, e.g., if the oil supply fails, a machine may suffer serious damage due to the direct contact of the parts moving relative to one another.

For these reasons, various combined bearings similar to those mentioned above have been proposed. With such bearings, the load to be transmitted is distributed over two bearings. Inasmuch as the oil quantity, the pressure before and behind the piston and the load has to be precisely adjusted relative to one another in order to achieve a functioning bearing, a significant investment in measuring and control equipment is required. Even with such measuring and control equipment, the desired adjustment is difficult to attain. In the known bearings supplied with outside oil, a variation in the load affects above all the roller bearing whereas the load on the hydrostatic bearing remains nearly constant.

The aforedescribed disadvantages are overcome, in accordance with the invention, by the inclusion of an hydrostatic control bearing responsive to the axially displaceable outer race of a rolling bearing and hydrostatic pressure within a piston chamber of an hydrostatic thrust bearing. Preferably, the hydrostatic control bearing consists of a flow-off slot extending over the entire periphery and opening into a peripheral groove of the housing. This results in a simple construction.

In accordance with a preferred embodiment of the invention, the piston of the hydrostatic thrust bearing may be arranged within a piston-like bushing of the hydrostatic control bearing. Both can be displaced axially with respect to each other and relative to other parts. In such a case, it is structurally simplest if on the side facing the piston-like bushing there is provided a common oil pressure chamber which makes connecting channels superfluous. Accordingly, the construction becomes simple and occupies little space.

In order to safely avoid contact of the parts moving relative to one another in the hydrostatic thrust bearing when there is no oil pressure, it is advisable in accordance with a further development to bias the piston of the hydrostatic thrust bearing away from the bearing contact surface by means of springs. Towards such end, the spring biasing force may be small.

Due to the fact that the rolling bearing, the piston-like bushing and the hydrostatic thrust bearing together with its piston are surrounded by a bushing having an L-shaped partial cross section and a cover, there is obtained a unit ready to be installed and standardized in its outer dimensions, constituting a combined bearing which has been obtained by the simplest means. Such bearing can be employed in all kinds of machines and can be exchanged if necessary by loosening and tightening of a few bolts or other suitable fastening devices.

Inasmuch as the piston of the hydrostatic thrust bearing and the pressure responsive face of the hydrostatic control bearing have predetermined constant dimensions and the pressure, due to the unthrottled connection, is always constant in both pressure spaces, the same load proportion will always be transmitted automatically while the external load varies. The proportions can be varied only by modification of the piston surface.

In order to achieve a stable bearing, care must be taken that the oil quantity not disturb the operating conditions in the hydrostatic thrust bearing, such oil quantity being normally constant and dimensioned relatively high in accordance with the maximum load to be expected and containing an additional quantity for the sake of safety. This is done in a simple manner by the flowing off of the pressure oil through the hydrostatic control bearing into the circumferential groove of the intermediate bushing from where a oil is returned into a pressure oil storage container. Thus the desired distribution is maintained at all times without any structural efforts and additional measuring and control devices.

While a combined bearing of the kind generally discussed here is known (German instrument of disclosure No. 2,059,836) wherein the load distribution is proportionally constant, the bearing disclosed therein is used in an axial piston pump with its self-generated oil pressure. However, the operating conditions offered thereby are not applicable to cases involving externally generated oil pressure, such as encountered by the present invention.

For a more detailed understanding of the invention, reference may be had to the following detailed description of an exemplary embodiment taken in conjunction with the single FIGURE of the drawing showing a partial cross section through the combination of a rolling bearing and an hydrostatic thrust bearing, in accordance with the invention.

On the stepped shaft 1 is arranged an angular contact rolling bearing assembly 2 which can transmit both axial and radial loads. The axial load share is transmitted by the outer ring 2' of the bearing 2 over a piston-like bushing 3 to an intermediate ring 4 having an L-shaped cross section. In tandem relation to the bearing 2 is arranged in hydrostatic bearing, comprising a bearing disk or ring-like spacing element 5 and a supporting ring 6 having a portion in the shape of a piston 6' with an oil delivery channel 7, a restricted orifice 7' and a reservoir 8. Both the bushing 3 and the supporting ring 6 are designed as pistons and have a common pressure chamber 9. An oil delivery channel 10 is connected to a suitable conventional source of hydrostatic fluid, such as an oil pump, runs through the pressure chamber 9 and continues over the channel 7 as far as the reservoir 8 of the hydrostatic bearing.

The bearing functions as follows: If an external axial load F appears and the oil pump (not shown) is at a standstill, the entire load passes initially through the angular contact bearing 2 over the bushing 3 to a point 3' into the intermediate ring 4 fixed in a housing 11. When the oil pump starts to operate, the pressure chamber 9 over the delivery channel 10 is filled with oil and due to the throttling action of the restricted orifice 7', the supporting ring 6 is pushed in the direction towards the bearing disk 5. As a result, the hydrostatic bearing starts to function and relieves (unloads) the angular contact bearing 2. As the oil quantity and thereby the oil pressure increases, the throttling effect of the orifice 7' results in the contact face 3' of the bushing 3 being lifted off the intermediate ring 4 with which it was normally in engagement. The oil quantity which is not needed for proper functioning of the hydrostatic thrust bearing flows off through the control passageway produced at 3' into a peripheral groove 15 and from there returns into a suitable oil storage container (not shown). Accordingly, an hydrostatic control bearing is produced whereby the ring portion in the zone of the contact face 3' acts as a passageway wall.

The area of the contact face 3' as well as the surfaces of a peripheral groove 3" provided in the bushing 3, on the one hand, in combination with the frontal surface of the piston 6', on the other hand, determine the proportions of the load transmitted over the two bearings. Inasmuch as these surfaces and the oil pressure on both pistons remain constant, no variation in the shares or proportions is possible even if the external load is varied. Regulation of the oil quantity is obtained by simple means through flow-off over the passageway at 3'. Thus faultless functioning of the hydrostatic bearing is ensured for varied external loads without any additional measuring and control devices. By selecting suitable piston surfaces, a sufficient lifetime of the rolling bearing can be attained.

Inasmuch as the piston 6', serving as the supporting ring of the hydrostatic thrust bearing, is arranged in the same space as the bushing 3 which also serves as a piston, and both can be displaced axially relative to each other and relative to other parts, and inasmuch, furthermore, as a common oil pressure chamber 9 is provided, the combined bearing becomes structurally simple without impairing its ability to function.

Inasmuch as it must be expected that the oil pressure of the hydrostatic thrust bearing will not yet have been built up when the machine is started, there is provided a spring 12 which biases the supporting ring 6 away from the rotating bearing support disk 5. Accordingly, direct contact and a possible destruction of the disk 5 and the supporting ring 6 are avoided.

In many applications it is desirable that the bearings be made available as units whose dimensions are standardized. Such a unit is disclosed in the exemplary embodiment in that there is provided an intermediate ring 4 having a partial cross section in L-shaped whose open end following introduction of the individual elements is closed off by a cover 13. Fastening of the unit to the housing 11 is obtained through the cover by means of suitable conventional fastening means at point 14.

Thus there is provided in accordance with the invention, a novel and improved combined bearing arrangement whereby, independent of the magnitude of the outside load, equal shares of the load are transmitted by both bearings at all times, without the need for complicated and costly control and regulating instruments.

It will be understood by those skilled in the art that the above disclosed embodiment is merely exemplary and that it is susceptible of modification and change without departing from the spirit and scope of the invention. Therefore, the invention is not deemed to be limited except as defined in the appended claims.

We claim:

1. In a combination bearing including a rolling bearing assembly mounted in a housing and capable of transmitting axial loads to the housing through an axially displaceable outer ring and an hydrostatic thrust bearing mounted in the housing in tandem with the rolling bearing assembly and having an axially displaceable piston forming, with a wall of the housing, an oil pressure chamber capable of receiving a constant quantity of externally produced oil supplied under pressure to the hydrostatic thrust bearing, the improvement comprising hydrostatic control bearing means positioned in the housing in abutment with the outer ring of the rolling bearing assembly and the wall of the housing, said hydrostatic control bearing means being axially displaceable from the wall of the housing in response to oil pressure within the pressure chamber for controlling flow-off of oil from the pressure chamber in such a manner that axial loads are transmitted through the rolling bearing assembly and hydrostatic thrust bearing in constant proportions, despite variations in axial loading.

2. A combination bearing as claimed in claim 1, having means for biasing the hydrostatic thrust bearing piston away from operative force relation to the rolling bearing assembly.

3. A combination bearing as claimed in claim 1, wherein said hydrostatic control bearing means is a bushing capable of forming a passageway communicating with the pressure chamber when said bushing is axially displaced from the wall of the housing, said passageway extending over the entire periphery of said bushing.

4. A combination bearing as claimed in claim 3, further comprising an intermediate bushing with a partial cross section in L-shape adapted to be positioned within the housing for enclosing the rolling bearing assembly, said bushing and the hydrostatic thrust bearing and associated piston, and a cover for said intermediate bushing adapted to be fastened to the housing.

5. A combination bearing as claimed in claim 3, wherein the piston of the hydrostatic thrust bearing is positioned within said bushing in such a manner that the piston and said bushing are axially displaceable relative to each other, said bushing forming, with the wall of the housing and the piston of the hydrostatic thrust bearing, the pressure chamber so that the pressure chamber is common to the piston and said bushing.

6. A combination bearing as claimed in claim 5, wherein the piston includes a pressure responsive face spaced from the wall of the housing and having a predetermined constant surface area; and wherein said bushing includes a contact face engageable with the wall of the housing and a pressure responsive face spaced from the wall of the housing, the contact face and the pressure responsive face of said bushing having predetermined constant surface areas.

7. A combination bearing as claimed in claim 3, wherein the housing includes a peripheral groove communicating with said passageway to receive flow-off of oil from the pressure chamber.--; and 8. In a step bearing including a housing having an inlet communicating with an external source of pressurized oil and a peripheral groove communicating with an oil storage container, a rolling bearing assembly mounted in the housing and capable of transmitting axial loads to the housing through an axially displaceable outer ring, and an hydrostatic thrust bearing mounted in the housing in tandem with the rolling bearing assembly and having an axially displaceable piston with a pressure responsive face of constant surface area spaced from a wall of the housing, the improvement comprising an hydrostatic control bearing including a bushing positioned in the housing in abutment, at one end, with the outer ring of the rolling bearing assembly, the other end of said bushing having a pressure responsive face of constant surface area spaced from the wall of the housing and a contact face of constant surface area abutting the wall of the housing so that axial loads may be transmitted to the housing from the outer ring of the rolling bearing assembly during inoperation of the hydrostatic thrust bearing; and a pressure chamber bounded on one side by the wall of the housing and on the opposite side by the pressure responsive faces of the piston and said bushing, the pressure chamber being capable of receiving a constant quantity of pressurized oil supplied to the hydrostatic thrust bearing from the external source of oil through the inlet, said contact face of said bushing being axially displaceable from the wall of the housing in response to oil pressure in said pressure chamber to form a passageway communicating with said pressure chamber and the groove in the housing for controlling the flow-off of oil from said pressure chamber through the groove in such a manner that during operation of the hydrostatic thrust bearing axial loads are transmitted through the rolling bearing assembly and hydrostatic thrust bearing in constant proportions, despite variations in axial loading.

* * * * *